United States Patent
Herman et al.

(10) Patent No.: US 12,370,475 B2
(45) Date of Patent: Jul. 29, 2025

(54) NON-METALLIC SEAL PLATE

(71) Applicant: Evoqua Water Technologies LLC, Pittsburgh, PA (US)

(72) Inventors: Bruce Herman, Schwenksville, PA (US); Lawrence P. Terrell, Jr., Wallingford, PA (US); Robert B. Hediger, Warrington, PA (US)

(73) Assignee: EVOQUA WATER TECHNOLOGIES LLC, Pittsburgh, PA (US)

( * ) Notice: Subject to any disclaimer, the term of this patent is extended or adjusted under 35 U.S.C. 154(b) by 328 days.

(21) Appl. No.: 17/740,967

(22) Filed: May 10, 2022

(65) Prior Publication Data
US 2022/0355226 A1    Nov. 10, 2022

Related U.S. Application Data

(60) Provisional application No. 63/186,238, filed on May 10, 2021.

(51) Int. Cl.
*B01D 33/333* (2006.01)
*B01D 33/056* (2006.01)

(52) U.S. Cl.
CPC ......... *B01D 33/333* (2013.01); *B01D 33/056* (2013.01)

(58) Field of Classification Search
CPC ........................... B01D 33/333; B01D 33/056
See application file for complete search history.

(56) References Cited

U.S. PATENT DOCUMENTS

| | | | |
|---|---|---|---|
| 2007/0241039 A1* | 10/2007 | Wilcher | B01D 33/333 210/160 |
| 2011/0186502 A1* | 8/2011 | Chang | B01D 33/50 210/330 |
| 2018/0223491 A1* | 8/2018 | Herman | E02B 1/006 |

* cited by examiner

*Primary Examiner* — Hayden Brewster
(74) *Attorney, Agent, or Firm* — Lando & Anastasi, LLP (57) ABSTRACT

Traveling water screens including a non-metallic seal plate mounted to a face of a carrier chain link proximate a side portion of a basket frame are disclosed. The seal plate is configured to reduce flow between the chain link and the basket. Related methods of retrofitting a traveling water screen are also disclosed.

20 Claims, 6 Drawing Sheets

NON-METALLIC SEAL PLATE

CROSS-REFERENCE TO RELATED APPLICATION

This application claims priority under 35 U.S.C. § 119(e) to U.S. Provisional Patent Application Ser. No. 63/186,238, titled "Non-Metallic Seal Plate" and filed on May 10, 2021, the entire disclosure of which is hereby incorporated herein by reference in its entirety for all purposes.

FIELD OF TECHNOLOGY

Aspects and embodiments disclosed herein relate generally to traveling water screens and, more specifically, to seal plates used in traveling water screens.

BACKGROUND

Traveling water screens are conventionally used to screen debris, plant material (including seaweed, leaves, branches and algae) and organisms, such as fish, from raw water intake installations in heavy industries. For example, a traveling water screen may be used upstream of an industrial facility or power plant that requires a large volume of cooling water. Ordinarily, water for such purposes is taken from a river or lake through an inlet water channel. Screening can ensure clean, debris-free raw water flow to machinery and other channels to prevent clogging and equipment damage, as well as to prevent entrained organisms from being killed.

SUMMARY

In accordance with one or more aspects, a traveling water screen is disclosed. The traveling water screen may comprise a basket comprising a frame having an upper portion, a lower portion, and side portions, a coarse screen secured to the frame, a carrier chain made of a plurality of chain links secured in series with chain pins to create joints, the basket attached to a chain link at a side portion of the frame, the carrier chain configured to move the basket about a predetermined path, and a seal plate made of a non-metallic material, the seal plate mounted to a face of the chain link proximate the side portion of the frame, the seal plate configured to reduce flow between the chain link and the basket.

In some aspects, the seal plate may be made of a material that is substantially resistant to temperature corrosion and fouling. The seal plate may be made of polypropylene, nylon or polytetrafluoroethylene (PTFE). The seal plate may substantially cover and extend beyond the face of the chain link to bridge any gap between the chain link and the basket. The seal plate may be constructed and arranged to facilitate rotational movement of the carrier chain. In at least some aspects, the seal plate is not positioned between the basket and the chain link.

In some aspects, the basket may be made of a non-metallic material. The basket may be made of a polymeric or composite material. The coarse screen may be made of a metallic material. In some aspects, the coarse screen may be made of stainless steel.

In some aspects, the traveling water screen may further comprise a plurality of baskets attached to the plurality of chain links and arranged in a continuous train on the carrier chain. The traveling water screen may further comprise a plurality of seal plates mounted on the chain links in an abutting, non-interfering relationship.

In some aspects, the traveling water screen may be positioned upstream of an inlet to a power plant cooling system, water treatment plant raw water intake, nuclear power plant or cooling tower makeup water system.

In accordance with one or more aspects, a method of retrofitting a traveling water screen comprising a basket having a frame, a screen secured to the frame, and a carrier chain made of a plurality of Chain links secured in series with chain pins to create joints, the basket attached to a chain link at a side portion of the frame, the carrier chain configured to move the basket about a predetermined path is disclosed. The method may comprise removing a seal mounted between the chain link and the basket, and securing a seal plate to a face of the chain link proximate the side portion of the basket, the seal plate made of a non-metallic material and constructed and arranged to reduce flow between the chain link and the basket.

In some aspects, the seal plate is made of polypropylene, nylon or polytetrafluoroethylene (PTFE). The seal plate may substantially cover and extend beyond the face of the chain link to bridge any gap between the chain link and the basket. The seal plate may be constructed and arranged to facilitate rotational movement of the carrier chain.

In some aspects, the method may further comprise securing seal plates to faces of each of the plurality of chain links in an abutting, non-interfering relationship between adjacent seal plates to allow joints to flex and move the carrier chain along the predetermined path.

In some aspects, the basket may he made of a metallic material, and the method may further comprise replacing the metallic basket with a basket made of a non-metallic material. In at least some aspects, the method may further comprise replacing a plurality of metallic baskets with non-metallic baskets.

In at least some aspects, the method may be performed without requiring underwater work.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

In accordance with one or more embodiments, a seal plate may be implemented to prevent flow between a basket and carrier chain in a traveling water screen. The seal plate may be made of a non-metallic material to deter rust, fouling and corrosion. The design may therefore be considered more environmentally friendly. The non-metallic seal plate may also be resistant to various thermal and chemical conditions, as well as associated with increased strength and durability. Its lighter weight may beneficially translate to less wear on drive components and less overall maintenance. The seal plate design as described herein may generally facilitate easy installation and upkeep, particularly in retrofitting applications.

Figure 1:
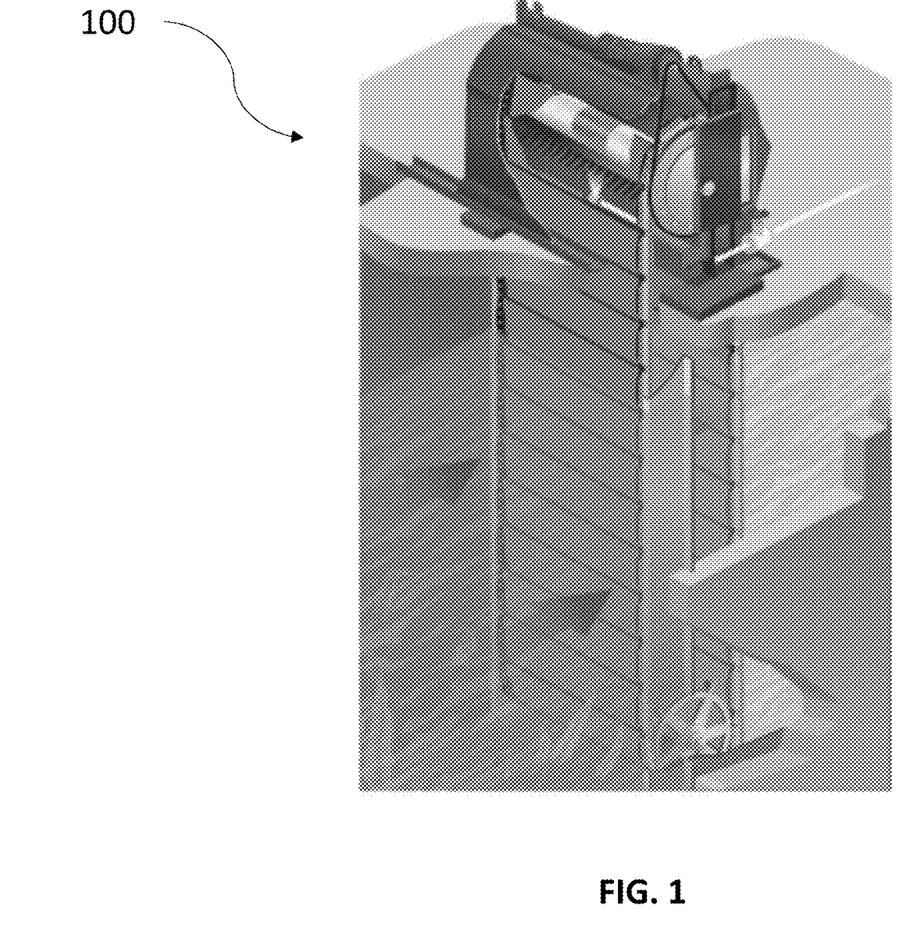
FIG. 1 presents a schematic view of a traveling water screen in accordance with one or more embodiments.

FIG. 1 presents a schematic view of a traveling water screen 100. In accordance with one or more embodiments, a traveling water screen may have an upright frame having a pair of spaced vertical support members. The support members may be mounted adjacent the opposed sides of the water inlet channel, such that water flowing through the channel cannot flow around the sides of the water screen. The frame may include a boot portion adjacent the bottom of the channel and a head portion anchored in a horizontal shelf above the water in the channel. A foot shaft or roll-around track may be supported for rotation at the boot portion. A head shaft may be supported for rotation at the head portion of the frame, and a drive motor may be connected to the head shaft. A pair of endless chains may be trained around sprockets mounted on the head and foot shafts. A plurality of screen baskets may be mounted on the chains and arranged in a continuous train for movement about a circuitous path defined around the head and foot shafts. Adjacent baskets may be mounted in a close, edge-to-edge relationship. Small gaps may exist between the baskets to provide clearance as the baskets travel around the head and foot shafts. On the upstream side of the frame, the train of baskets may move upwardly from the foot shaft toward the head shaft, thereby forming a substantially continuous upwardly moving screen on the upstream side of the frame.

A traveling water screen may consist of a series of overlapping, inclined self-draining screen baskets fastened to two strands of steel sidebar bushed chain operating over appropriate head and boot sprockets mounted on a structural steel frame and complete with spray system, splash housing and drive. Intake water passes through the submerged screen baskets and deposits suspended and floating debris on the screen cloth of the inclined baskets and their lower members which form a shelf for lifting large quantities of solid matter. When the screen mechanism is operated the screen baskets are lifted from the intake well and debris is removed at the head section by high pressure overlapping water sprays across the entire back of the screen baskets. Spray water washes the debris into a trough located in front of the baskets and flushes away the solid matter for disposal.

In accordance with one or more embodiments, a traveling water screen may include a plurality of baskets. Each basket may comprise a frame having an upper portion, a lower portion, and side portions. A coarse screen may be secured to the frame. A cross-beam may support the coarse mesh. Endplates may be compression molded. In some embodiments, the baskets may be made of metal. In other embodiments, the baskets may be constructed of an advanced composite or polymeric material that is lighter than standard carbon steel but of high strength able to withstand high head loss pressures. The baskets may be characterized by a debris-lifting capacity. In some non-limiting embodiments, a 24-inch pitch basket may have 6 inches of debris lifting capacity. The basket frame may be substantially corrosion resistant as well as resistant to biological fouling.

A typical traveling water screen may have between about 12 and about 120 baskets. Each of the plurality of baskets may be connected by any means capable of moving the baskets around a predetermined path, for example, a circuitous path. In some embodiments, the plurality of baskets may be connected by a chain trained around a sprocket. The sprocket and chain may be connected by a drive unit connected to the headshaft.

The drive unit may be further connected to a movement control system configured to control the movement of the plurality of baskets. For example, the movement control system may adjust the speed of the plurality of baskets based on a sensed system variable. A sensor positioned anywhere on the traveling water screen system may transmit an input signal to the controller, which may then transmit an output signal to, for example, the drive unit. In some embodiments, the system variable may be at least one of a water demand, pressure, temperature, flowrate, water levels, or temporal season. The control may further be connected to a timer.

In accordance with one or more embodiments, a carrier chain may include a series of chain links secured with chain pins to create joints. Each basket of the traveling water screen may be associated with a single chain link. In some embodiments, each basket may be attached to a dedicated chain link. Conventionally, seals have been inserted between the basket and the respective chain link. Such seals pose various challenges with respect to installation, maintenance and safety.

Beneficially, seal plates in accordance with one or more disclosed embodiments may provide a new basket to carrier chain assembly that is easier to install. This may especially be the case when using non-metallic baskets. With traveling water screens, when there is a switch from steel basket assemblies to non-metallic basket assemblies, updated seals have to be added to the screen frame. Adding these seals onsite involves underwater work by divers. Or, as an alternative, a crane could be brought in to pull the screen from the well so that the work can be done on the ground. The new seal plates described herein can be installed as the non-metallic baskets are installed. The screen will not need to be removed from the well and divers will not be required to install the new seal plates.

The seal plates can be constructed of any suitable seal or gasket material. The material should generally be rigid to meet the demands of the intended application. The material of the seal plate should generally be resistant to thermal and chemical conditions, as well as be generally resistant to corrosion, fouling, cracking and shrinkage. The material of the seal plate should generally be compatible with that of other components of the traveling water screen including the basket, carrier chain and screen. In at least some embodiments, the seal plate is constructed for use in saltwater applications. In some embodiments, the seal plates may be made of polypropylene, nylon or polytetrafluoroethylene (PTFE). This invention in not limited to the type of seal or the material of the seal. In some embodiments, the seal plates may be molded during manufacture and the overall design may be optimized to reduce material usage, such as by incorporating a grid or other pattern on the back side. One or more features may also be incorporated during the manufacturing process to facilitate attachment as described herein, such as a countersunk through-hole to accommodate a bolt.

Figure 2:
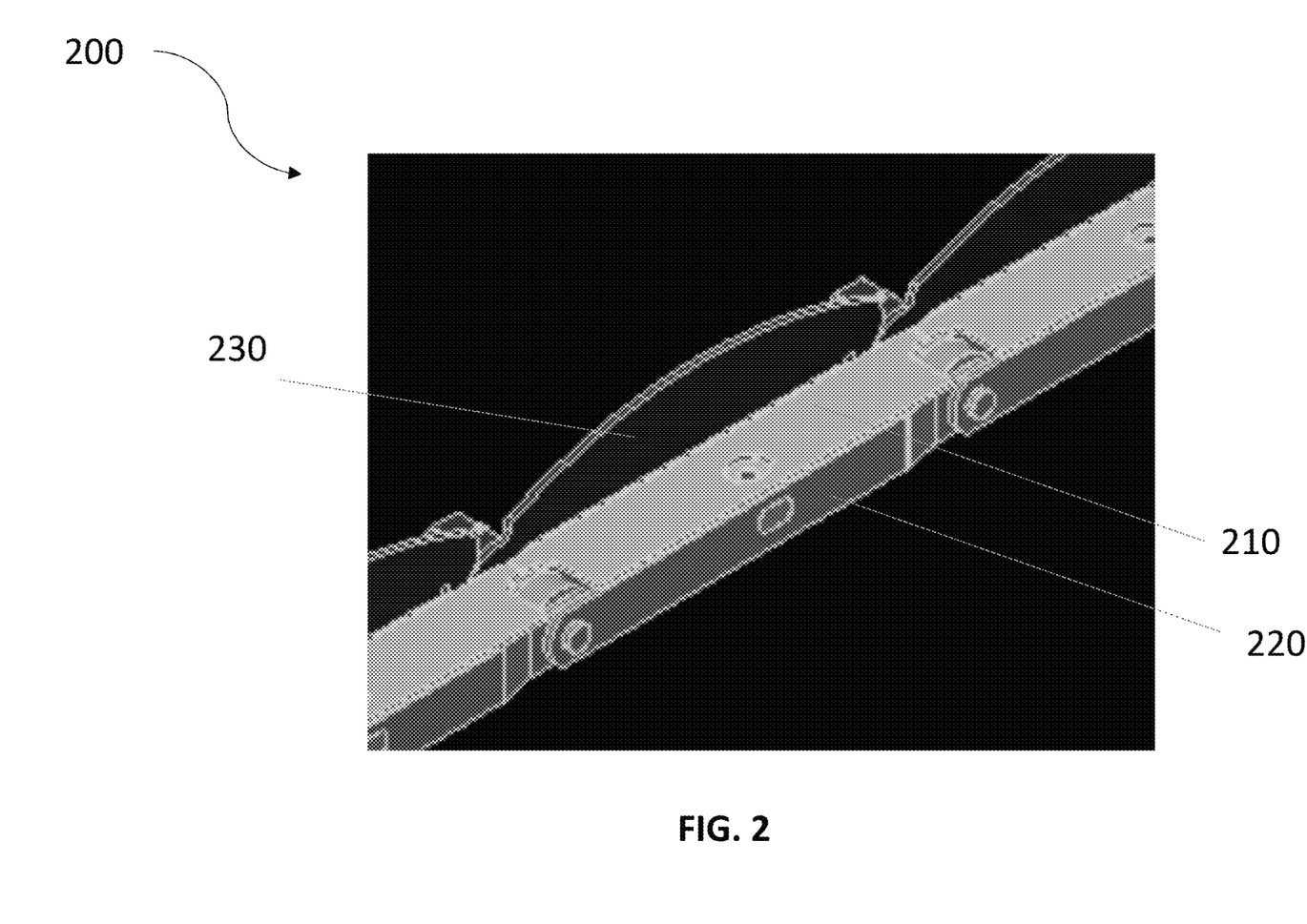
FIG. 2 presents a perspective view of a seal plate mounted in a traveling water screen in accordance with one or more embodiments.

In accordance with one or more embodiments, the seal plate is not positioned between the basket and the chain link. Instead, the seal plate is mounted to a face of the chain link proximate the side portion of the basket frame. FIG. 2 presents a perspective view of a seal plate 210 mounted in a traveling water screen 200. Seal plate 210 is mounted to chain link face 220 proximate basket frame side portion 230. Various methods of mechanical attachment will be recognized by those skilled in the art. In at least some embodiments, a bolt is used to secure the seal plate to the chain link. Beneficially, the seal plate may be mounted to an existing rivet in the chain link of the carrier chain.

In accordance with one or more embodiments, the seal plate may substantially cover the face of the chain link. The seal plate may extend beyond the face of the chain link in order to bridge any gap between the chain link and the basket. In some non-limiting embodiments, a 0.25 inch to 0.75 inch gap may exist between the chain link and the basket. The seal plate may generally have a flat surface flush with the chain link.

In accordance with one or more embodiments, the seal plates may generally be constructed and arranged to facilitate rotational movement of the drive chain. In some non-limiting embodiments, the seal plates may be configured with a notch or other feature to accommodate joints or hinges between adjacent sections of the carrier chain. Adjacent seal plates may generally abut without interfering with each other during rotational operation of the traveling water screen.

Figure 3:
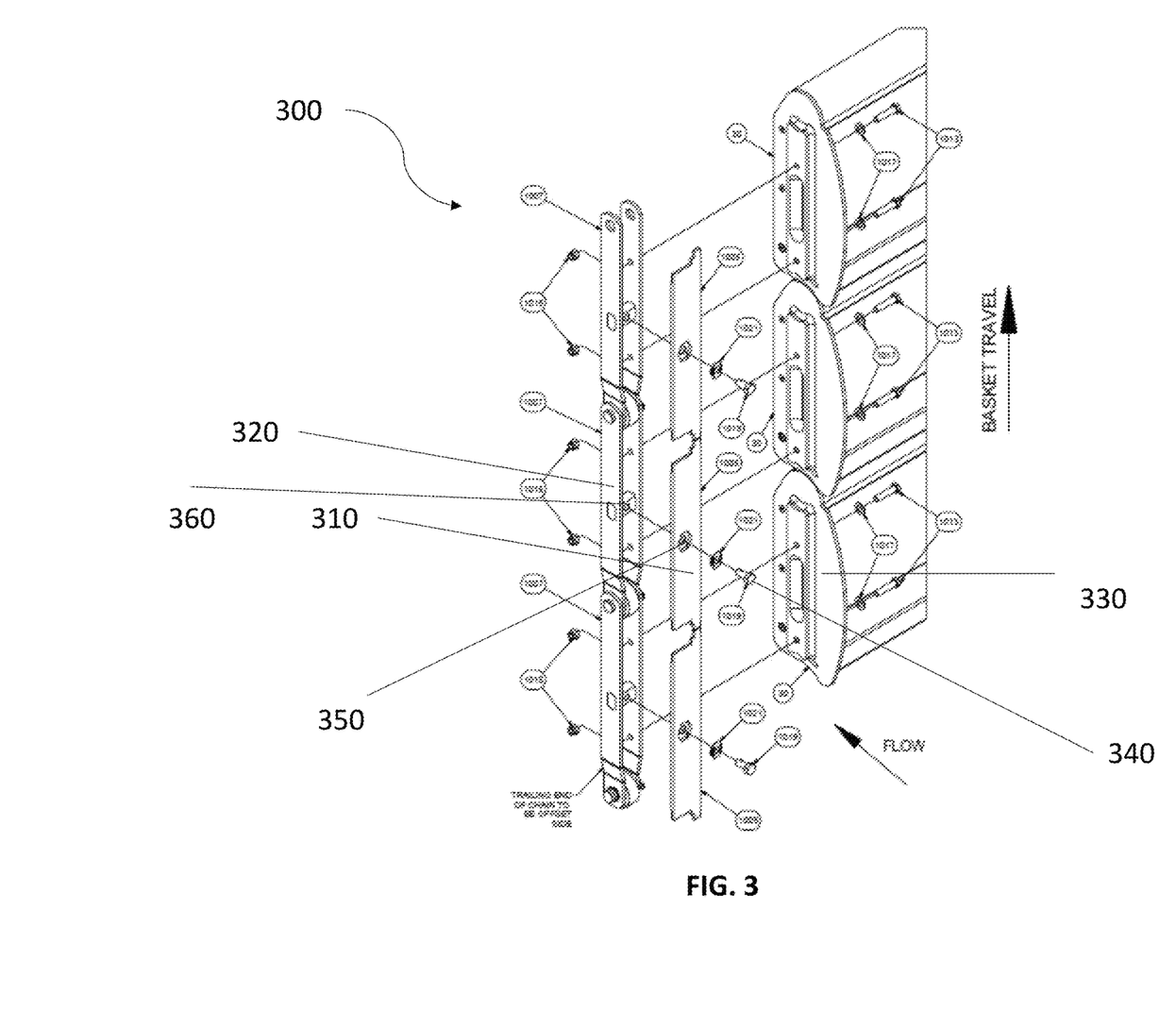
FIG. 3 presents an exploded view of a traveling water screen including seal plates in accordance with one or more embodiments.
Figure 4A:
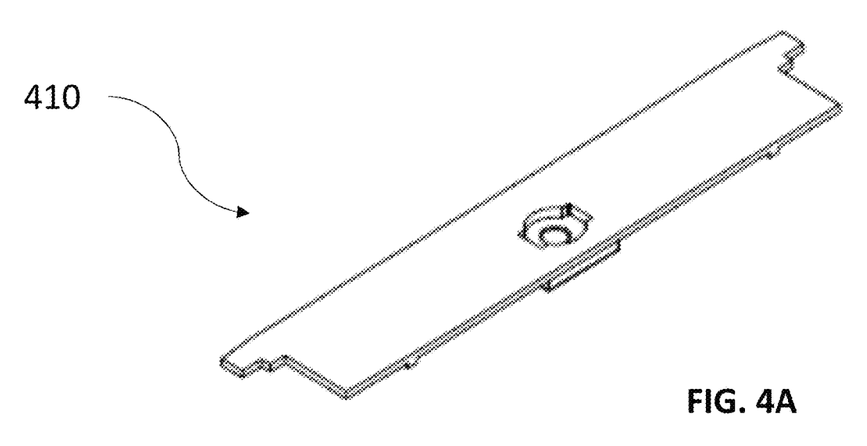
FIG. 4A presents a top perspective view of a seal plate in accordance with one or more embodiments.
Figure 4B:
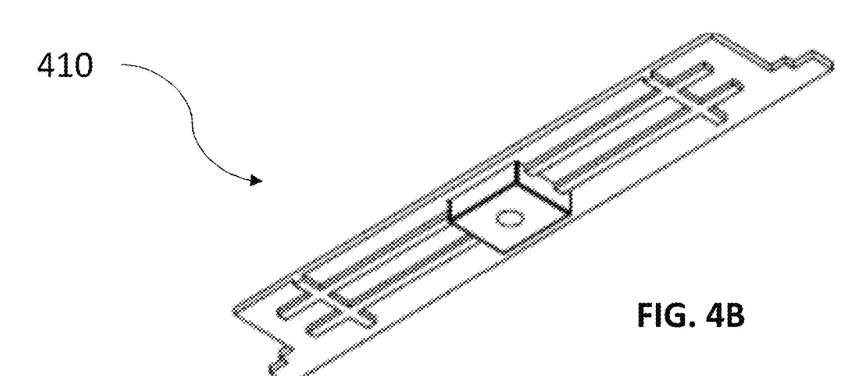
FIG. 4B presents a bottom perspective view of a seal plate in accordance with one or more embodiments.
Figure 4C:
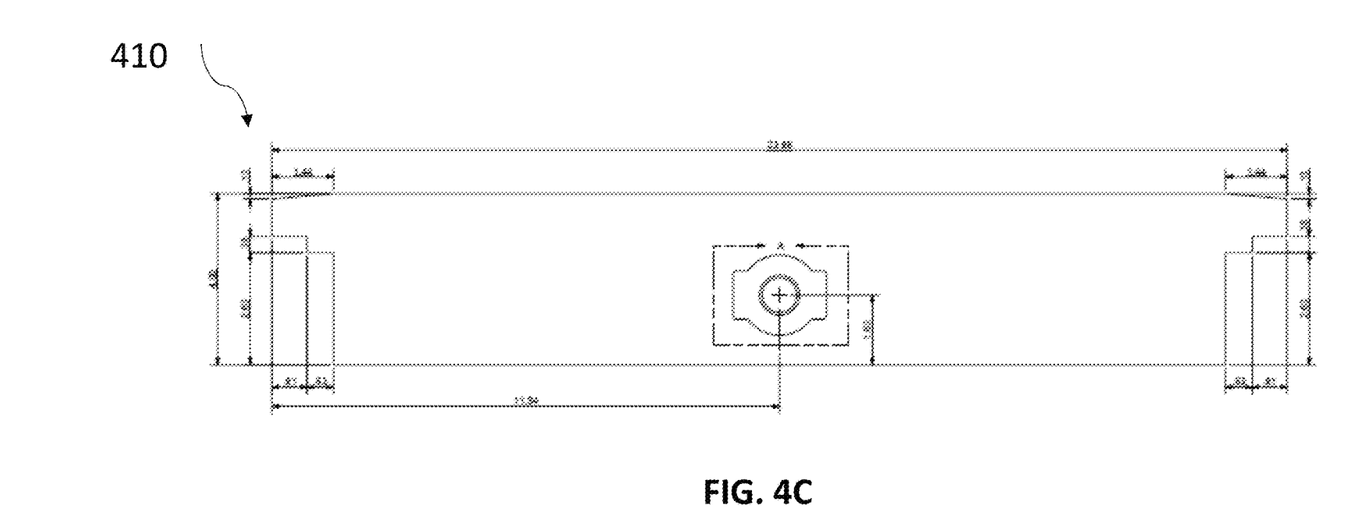
FIG. 4C presents a top plan view of a seal plate in accordance with one or more embodiments.
Figure 4D:
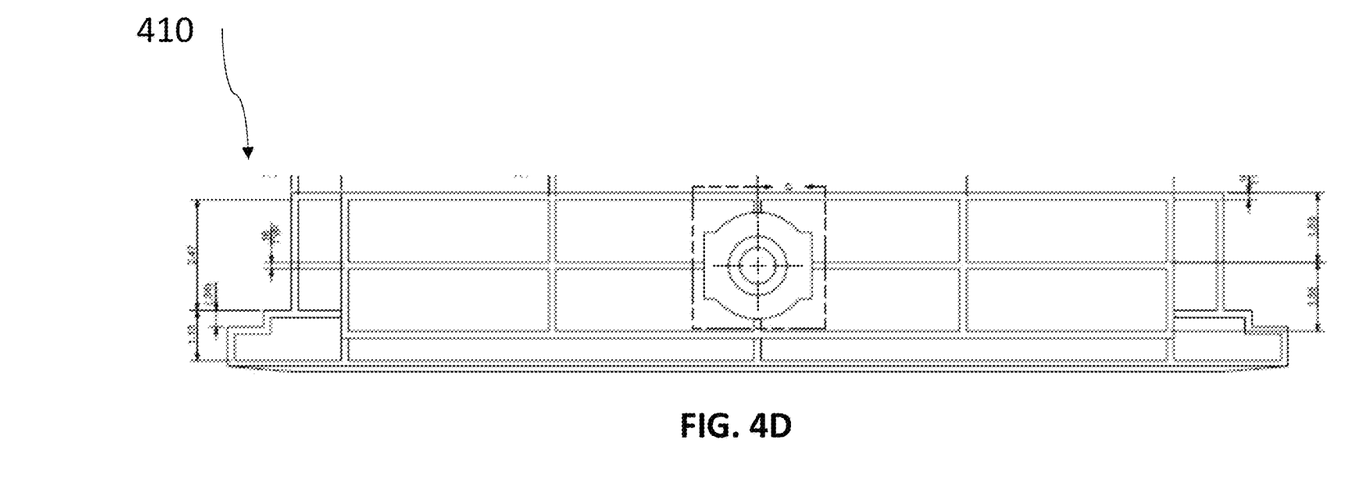
FIG. 4D presents a bottom plan view of a seal plate in accordance with one or more embodiments.
Figure 4E:
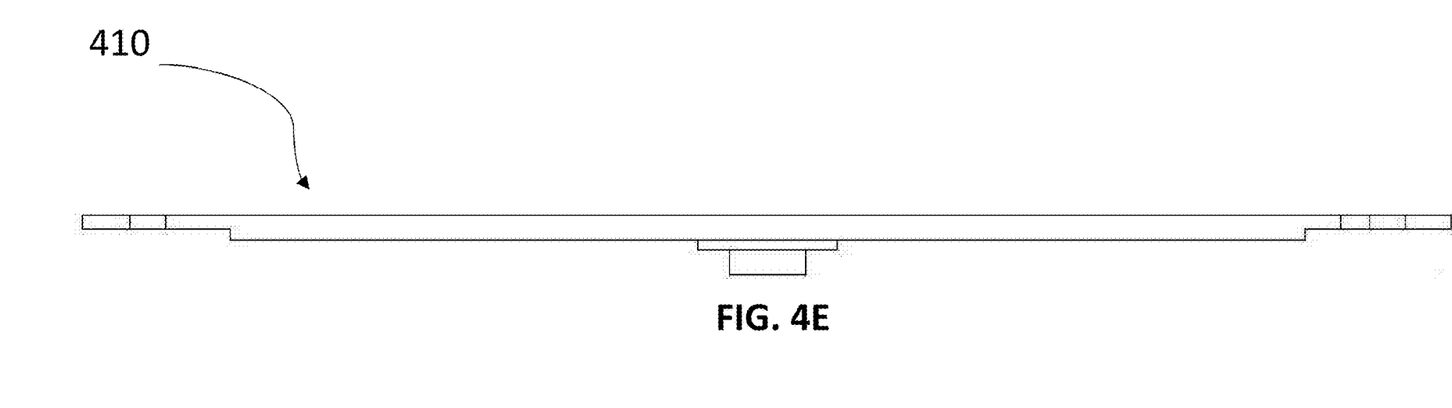
FIG. 4E presents a side view of a seal plate in accordance with one or more embodiments (the front and rear elevational views are identical)
Figure 4F:
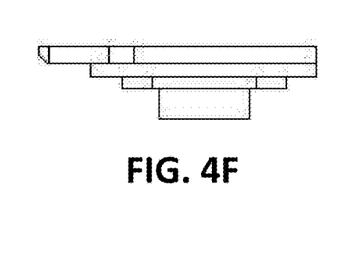
FIG. 4F and FIG. 4G presents elevational side views of both ends of a seal plate in accordance with one or more embodiments.
Figure 4G:
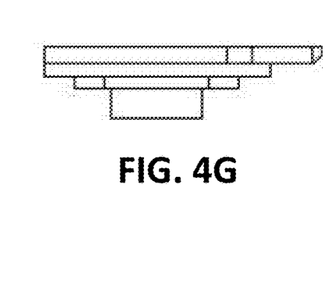

FIG. 3 presents an exploded view of a traveling water screen including seal plates 310 in accordance with one or more embodiments. A plurality of baskets 330 are mounted to the carrier chain and arranged in a continuous train. Each chain link face 320 of the carrier chain includes a seal plate 310 as described herein. As illustrated, a bolt 340 is used to secure seal plate 310 to the chain link face 320 via throughhole 350 and rivet 360.

In accordance with one or more embodiments, the disclosed seal plates may prevent flow and/or debris from bypassing the basket mesh through the chain links.

FIGS. 4A-4G present various views of a seal plate in accordance with one or more embodiments.

A traveling water screen may be retrofitted in accordance with one or more embodiments. The traveling water screen to be retrofitted may comprise a basket having a frame, a screen secured to the frame, and a carrier chain made of a plurality of chain links secured in series with chain pins to create joints, the basket attached to a chain link at a side portion of the frame, the carrier chain configured to move the basket about a predetermined path.

The traveling water screen to be retrofitted may include a seal mounted between the carrier chain and the side portion of the basket. This seal can be removed. A new seal plate can be attached to a face of the chain link associated with the basket. The new seal plate may generally be proximate the side portion of the basket. The new seal plate can be made of a non-metallic material. The new seal plate can reduce flow between the chain link and the basket. The new seal plate may substantially cover and extend beyond the face of the chain link to bridge any gap between the chain link and the basket. Seal plates can be secured to faces of each of the plurality of chain links in an abutting, non-interfering relationship between adjacent seal plates to allow joints to flex and move the carrier chain along the predetermined path. As part of the retrofit, a metallic basket can optionally be replaced with a non-metallic basket. A plurality of non-metallic baskets can be installed in an overall traveling water screen. In at least some embodiments, the retrofit process is performed without requiring underwater work.

In accordance with one or more embodiments, a typical traveling water screen includes a coarse mesh screen for filtering debris and fish from the intake water stream. Accordingly, most intake screens comprise coarse screens having mesh openings of greater than 6 mm$^2$. The coarse mesh wire may be comprised of any material capable of withstanding normal operation of traveling water screens including intake water pressure. In some embodiments, the coarse mesh wire may be metal. In some embodiments, the coarse mesh wire may be stainless steel. In some embodiments, the coarse mesh screen wire may have a diameter of about 0.04 in. to about 0.105 in. In some embodiments, the coarse mesh screen wire may have a diameter of about 0.06 in.

In accordance with one or more embodiments, a traveling water screen may be one as described in U.S. Pat. No. 10,669,683 to Applicant (Evoqua Water Technologies, LLC).

In accordance with one or more embodiments, the traveling water screen may be positioned upstream of various applications including power plant cooling systems, water treatment plant raw water intake, nuclear power plants and cooling tower makeup water systems.

In accordance with one or more embodiments, the traveling water screen may be configured for thru-flow or dual-flow operation. Submerged screen surfaces may generally be perpendicular to the intake flow, with screen mesh openings sized according to customer requirements and site conditions.

A controller may be implemented for monitoring and/or controlling various system parameters including but not limited to rotation of the carrier chain and operation of the water spray assembly. Various aspects of the invention may be implemented as specialized software executing in a general-purpose computer system. The computer system may include a processor connected to one or more memory devices, such as a disk drive, solid state memory, or other device for storing data. Memory is typically used for storing programs and data during operation of the computer system. Components of computer system may be coupled by an interconnection mechanism, which may include one or more busses (e.g., between components that are integrated within a same machine) and/or a network (e.g., between components that reside on separate discrete machines). The interconnection mechanism enables communications (e.g., data, instructions) to be exchanged between system components of system. The computer system also includes one or more input devices, for example, a keyboard, mouse, trackball, microphone, touch screen, and one or more output devices, for example, a printing device, display screen, and/or speaker.

The output devices may also comprise valves, pumps, or switches. One or more sensors may also provide input to the computer system. These sensors may include, for example, intake stream flow rate, fish and/or debris level, and/or other sensors useful in a traveling water screen. These sensors may be located in any portion of a traveling water screen where they would be useful, for example, in an inlet or outlet stream of the traveling water screen. In addition, the computer system may contain one or more interfaces that connect the computer system to a communication network in addition or as an alternative to the interconnection mechanism.

The function and advantages of these and other embodiments can be better understood from the following example. This example is intended to be illustrative in nature and is not considered to be limiting the scope of the invention.

Example: Retrofitting a Traveling Water Screen

A Rex® traveling water screen commercially available from Evoqua Water Technologies LLC (Pittsburgh, PA) was retrofitted in accordance with one or more disclosed embodiments.

The metallic baskets of the traveling water screen were replaced with baskets made of a composite material. The new baskets are stronger, more durable and up to 50% lighter than the metallic baskets which translates to less wear on the associated drive components. The new baskets also have a superior debris capacity with a six-inch lifting lip (24 inch pitch basket).

The existing seal plates mounted between chain links of the carrier chain and the baskets were removed. A new seal plate was mounted to a face of each chain link, the new seal plates being made of polypropylene to promote temperature, corrosion and fouling resistance. The new seal plates were securely attached from deck level to existing center rivets on the carrier chain without any underwater technician time required. The seal plates are no longer considered a wear item and are expected to require no maintenance. During operation, the seal plates will prevent debris from bypassing the basket mesh through the chain links.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A traveling water screen, comprising:
a basket comprising a frame having an upper portion, a lower portion, and side portions;
a coarse mesh secured to the frame;
a carrier chain made of a plurality of chain links secured in series with chain pins to create joints, the basket attached to a chain link at a side portion of the frame, the carrier chain configured to move the basket about a predetermined path; and
a seal plate made of a non-metallic material, the seal plate mounted to a face of the chain link proximate the side portion of the frame, the seal plate constructed and arranged to reduce a flow of water between the chain link and the basket when the traveling water screen is positioned upstream of a water inlet.

2. The traveling water screen of claim 1, wherein the seal plate is made of a material that is substantially resistant to temperature, corrosion and fouling.

3. The traveling water screen of claim 2, wherein the seal plate is made of polypropylene, nylon or polytetrafluoroethylene (PTFE).

4. The traveling water screen of claim 1, wherein the seal plate substantially covers and extends beyond the face of the chain link to bridge any gap between the chain link and the basket.

5. The traveling water screen of claim 1, wherein the seal plate is constructed and arranged to facilitate rotational movement of the carrier chain.

6. The traveling water screen of claim 1, wherein the seal plate is not positioned between the basket and the chain link.

7. The traveling water screen of claim 1, wherein the basket is made of a non-metallic material.

8. The traveling water screen of claim 7, wherein the basket is made of a polymeric or composite material.

9. The traveling water screen of claim 1, wherein the coarse mesh is made of stainless steel.

10. The traveling water screen of claim 1, further comprising a plurality of baskets attached to the plurality of chain links and arranged in a continuous train on the carrier chain.

11. The traveling water screen of claim 10, further comprising a plurality of seal plates mounted on the chain links in an abutting, non-interfering relationship.

12. The traveling water screen of claim 1, wherein the water inlet is an inlet to a power plant cooling system, water treatment plant raw water intake, nuclear power plant or cooling tower makeup water system.

13. A method of retrofitting a traveling water screen positioned upstream of a water inlet, the traveling water screen comprising a basket having a frame, a mesh secured to the frame, a carrier chain made of a plurality of chain links secured in series with chain pins to create joints, and a seal or gasket mounted between the chain link and the basket, the basket attached to a chain link at a side portion of the frame, the carrier chain configured to move the basket about a predetermined path, the method comprising:
removing the seal or gasket mounted between the chain link and the basket; and
securing a seal plate to a face of the chain link proximate the side portion of the basket, the seal plate made of a non-metallic material and constructed and arranged to reduce a flow of the water between the chain link and the basket.

14. The method of claim 13, wherein the seal plate is made of polypropylene, nylon or polytetrafluoroethylene (PTFE).

15. The method of claim 13, wherein the seal plate substantially covers and extends beyond the face of the chain link to bridge any gap between the chain link and the basket.

16. The method of claim 13, wherein the seal plate is constructed and arranged to facilitate rotational movement of the carrier chain.

17. The method of claim 13, comprising securing seal plates to faces of each of the plurality of chain links in an abutting, non-interfering relationship between adjacent seal plates to allow joints to flex and move the carrier chain along the predetermined path.

18. The method of claim 13, wherein the basket is made of a metallic material, and wherein the method further comprises replacing the metallic basket with a basket made of a non-metallic material.

19. The method of claim 18, further comprising replacing a plurality of metallic baskets with non-metallic baskets.

20. The method of claim 13, wherein the method is performed without requiring underwater work.

* * * * *